July 3, 1945.  E. H. BUTLER  2,379,622
ARTICLE HANDLING DEVICE
Filed Jan. 13, 1943  2 Sheets-Sheet 1
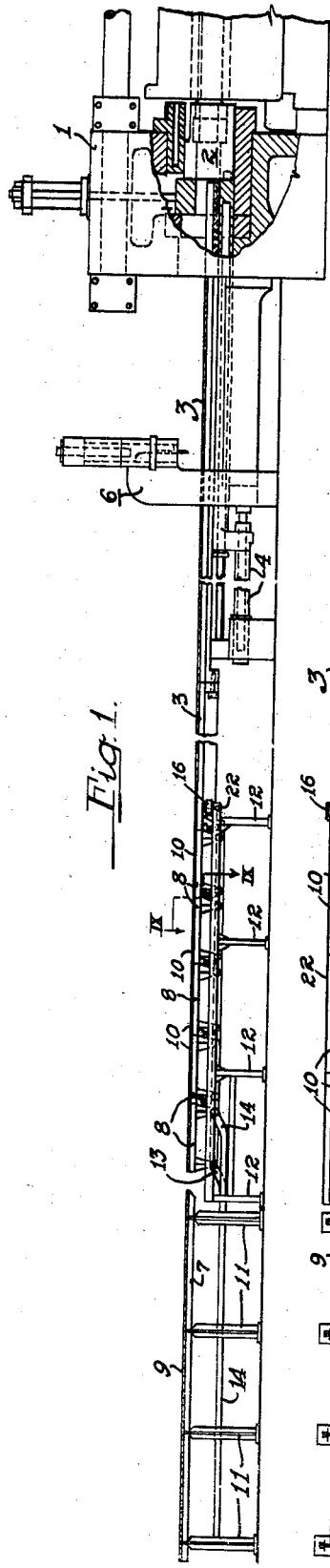
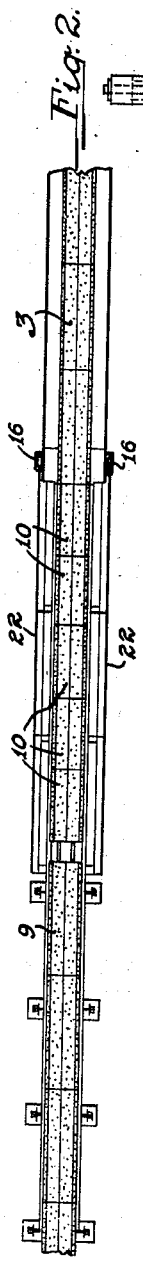
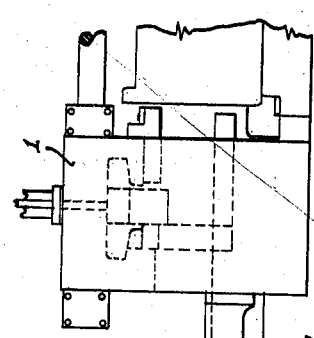
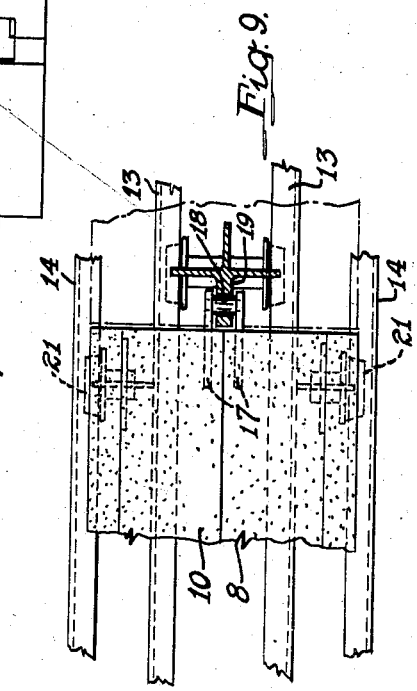
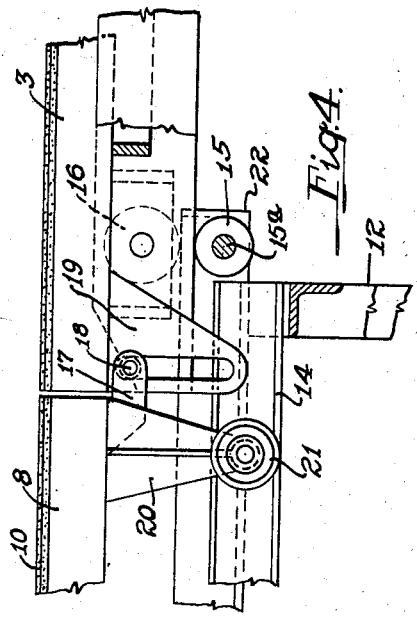
INVENTOR
Edward H. Butler
BY
ATTORNEY

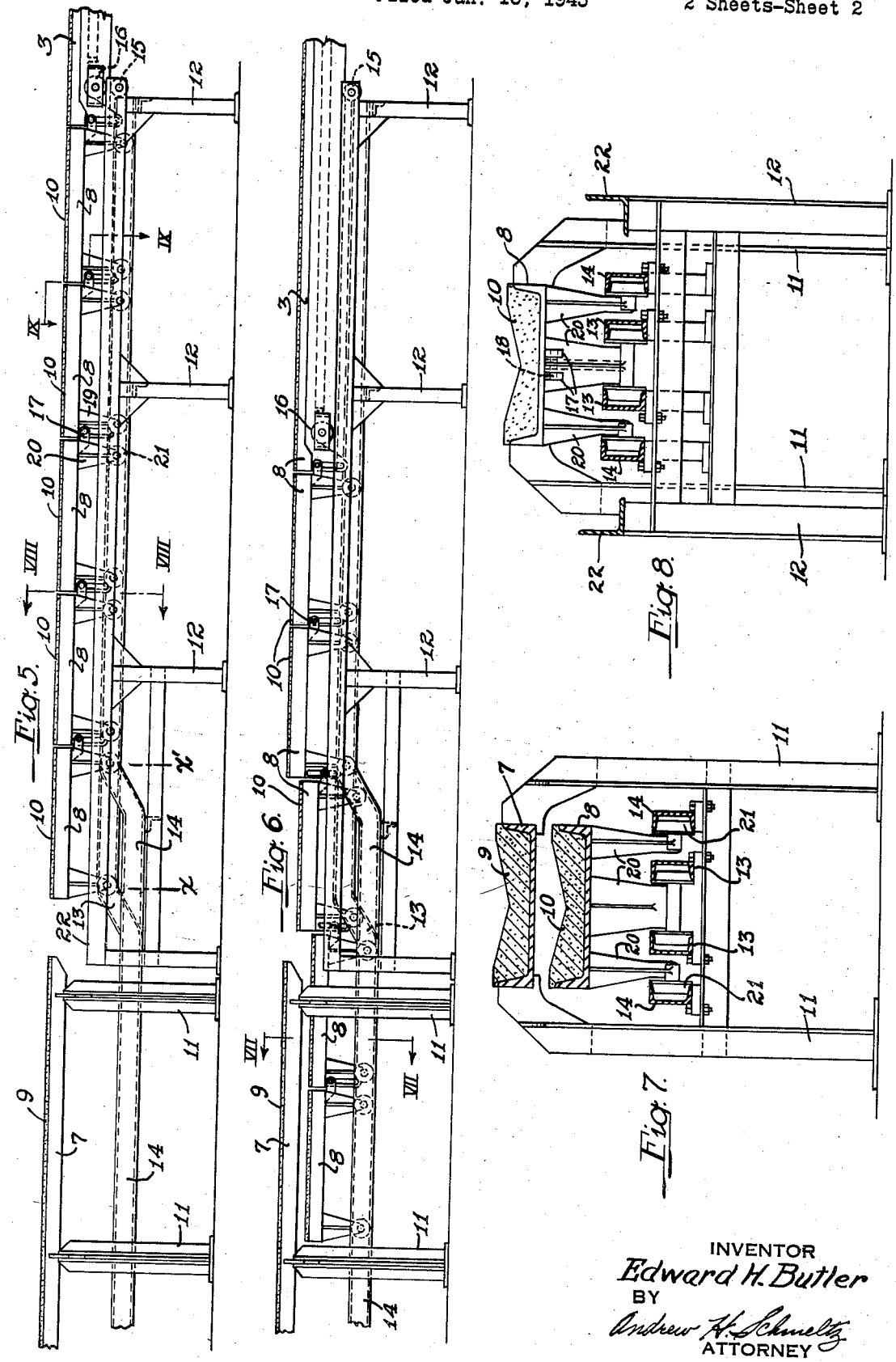

Patented July 3, 1945

2,379,622

UNITED STATES PATENT OFFICE 2,379,622

ARTICLE HANDLING DEVICE

Edward Hugh Butler, West Lafayette, Ind., assignor to Aluminum Company of America, Pittsburgh, Pa., a corporation of Pennsylvania Application January 13, 1943, Serial No. 472,288

7 Claims. (Cl. 207—2)

The invention relates to a work handling device adapted to the handling of long shapes, particularly those of relatively small cross section which are relatively plastic or deformable at the time of handling. In the manufacture and manipulation of such shapes there are occasions when it is desirable, for one purpose or another, to move or advance the work from one handling or receiving surface to another without materially disturbing the plane in which the work lies and without ceasing to support the work over any material portion of its length, thus to prevent bending or deformation. When the work is metallic and is hot, manipulative means for this purpose are particularly desirable. An example of such problems is found in the metal extruding process. There the extruded shape, issuing from the die, is usually guided to an elongated receiving surface along which it then progresses, under the force of the extruding action, until extrusion of the metal in the press is completed. If this work receiving surface, usually carried on a table, is extended up to the press so as to receive the extruded shape immediately it issues from the press, then after each operation the table, or the part thereof adjacent the press, must be removed to allow forward movement of the extruding tool assembly from the press. This movement of the tool assembly out of the press is necessary to allow the butt of unextruded metal remaining after the extrusion operation to be sheared or otherwise removed. If no receiving surface is provided adjacent the press, then a gap exists over which the extrusion must be initially carried and over which it must thereafter move unsupported. Regardless of which procedure is used, there always exists a time during which a material portion of the extruded shape moves or rests unsupported. This lack of support allows sagging of the shape with consequent deformation thereof and entails later straightening and reshaping operations.

The present invention is generally useful in the handling of work or shapes of the type described where similar problems exist. It is particularly useful when a device constructed in accordance therewith is used in combination with an extrusion press to solve the difficulties above detailed. Therefore, its several objects and advantages will be illustrated with reference to its use in combination with a metal extrusion press, and the following description and the accompanying drawings are specifically directed to such a use, but the invention is not limited thereto except as indicated in the appended claims.

In the drawings,

Fig. 1 is a diagrammatic side elevation view of one form of article handling device embodying the invention and is shown in combination with an extrusion press, some parts of which have been cut away to show the extrusion tool assembly;

Fig. 2 is a plan view of the article handling device shown in Fig. 1;

Fig. 3 is a diagrammatic side elevation view of the apparatus of Fig. 1 and illustrates the position assumed by elements of the metal handling device when the extrusion tool assembly is moved forwardly of the press after the extrusion operation;

Fig. 4 is an enlarged view partly in section of certain parts at the connection between the press table and mobile elements of the article handling device;

Fig. 5 is an enlarged view of a portion of the elements shown in side elevation in Fig. 1;

Fig. 6 is similar to Fig. 5, but shows the position of certain elements as the extrusion tool assembly is moved partially forwardly of the press after the extrusion operation;

Fig. 7 is a sectional end view, on an enlarged scale, taken on the line VII—VII of Fig. 6;

Fig. 8 is a view on an enlarged scale taken on the line VIII—VIII of Fig. 5; and Fig. 9 is an enlarged plan view, partially in section, taken as indicated by the lines IX—IX of Fig. 5.

In these drawings like numerals designate like parts.

The apparatus as shown consists of a press assembly and an article handling device. The conventionally designed press assembly consists of a press 1 containing essential press elements including the tool assembly 2. A press table 3, which immediately receives the product of the press during the extrusion operation, is operatively linked with the tool assembly 2, in any convenient manner, to move therewith. During the extrusion operation the tool assembly and the press table occupy the position illustrated in Fig. 1. When the extrusion operation is completed, a hydraulic device, indicated generally at 4, moves the tool assembly 2 and the press table 3 to the position shown in Fig. 3, thus registering the unextruded metal butt 5 with the shear assembly 6. The shear is then operated to cut off the butt 5 and the tool assembly and press table are returned to the extrusion position (Fig. 1) and readied for a further extrusion operation.

The article handling device comprises a fixed table 7 and a mobile table formed of the mobile units 8. In one position, herein called the normal position, the surface 10 of a unit 8 forms with the surface 9 of the table 7 an elongated article handling surface all lying in the same plane and in the plane of the surface of the press table 3. The mobile table is attached to the end of the press table and thus forms an extension thereof, the movement of which toward and away from the fixed table 7 is actuated by the hydraulic device 4 above mentioned. The fixed table 7 is supported by the piers or columns 11 and these and the similar columns 12 also support the trackways 13 and 14. These trackways are composed of inner tracks 13 and outer tracks 14 and they primarily serve to support the mobile table units 8. Each track extends from a point represented by the end of the press table 3, when it is in its fully retracted position, outwardly toward the fixed table 7 to normally support the mobile units with their surfaces 10 between the fixed table and the press table and in a common plane therewith. Adjacent the fixed table 7 each track extends downwardly at a point of inclination X or X' and from thence to a level lower than the fixed table and, in the embodiment here shown, directly under the fixed table. The angle of inclination downwardly from the point of inclination is the same for all tracks, at least during the initial distance of inclination. The end of the press table 3 is supported on rollers 15 (Fig. 4) which facilitates its movement toward the fixed table 7. The rollers 15 are mounted on a cross shaft 15a, the ends of which are suitably secured to horizontally extending rails 22 carried on the upper ends of the columns 12. Wheels 16, mounted on the sides of said press table adjacent the end thereof, ride on the upper sides of the rails 22 and support the end of the press table 3 against vertical deflection when the table 3 is moved toward the fixed table 7.

The mobile units 8 are linked together for vertical movement with respect to each other. This linkage comprises the ears 17 in which are mounted pins 18 which operate in vertical slots cut in lugs 19. Similar linkage connects the end of the press table 3 with one end of the mobile unit adjacent thereto (for instance, Fig. 4).

The mobile units 8 are operatively mounted on the trackways by means of legs 20 carrying one or more wheels 21 which latter are designed to operate in the trackways, and each end of each unit is supported by this means on the trackways, one end being solely supported on the inner tracks 13 and the other end solely supported on the outer tracks 14. It will be noted that the points of inclination X of the inner tracks 13 are longitudinally spaced from the points of inclination X' of the outer tracks 14. The longitudinal distance between the points X and the points X' determines the distance between the mountings which support opposite ends of each mobile unit 8. Thus, as here shown, the mountings which support the left end of a mobile unit 8 on inner tracks 13 are so longitudinally spaced from the mountings which support the opposite end of the unit on outer tracks 14 that all wheels 21 attached to the unit simultaneously reach the points of inclination as the mobile unit is moved toward the fixed table 7. The angle of inclination of each track downwardly from its point of inclination is, initially at least, the same and, therefore, as each mobile unit 8 approaches the fixed table 7 and as its mountings reach and pass the points of inclination, the unit is lowered without tilting and thus maintains its surface 10 parallel to the plane of the fixed surface 9 as it is removed from the plane of that surface. Thus the surface of the mobile table, or units thereof, which is normally positioned in the plane of the surface 9 of the fixed table 7, which is also the plane of the surface of the press table 3, moves out of or into said plane while remaining substantially parallel thereto. The surfaces 9 of the fixed table 7, the mobile table and the press table 3 may be concave, as shown, or flat or of any other configuration consistent with the handling of the article at hand. However, whatever its configuration, the surface along which the article travels as it moves from one table to the next should be at substantially the same level, and it is in this sense that the table surfaces are said to lie in the same plane.

In the operation of the invention in the form here shown the parts are positioned as shown in Fig. 1 and Fig. 5 and extrusion is started. As the extruded shape is formed by a die located in the tool assembly 2, the shape leaves the press and, under the continuing force of the extrusion, proceeds as it is produced along the press table 3, onto and along the surface 10 of the mobile table and finally onto and along the surface 9 of the fixed table 7. When the operation is complete the extrusion will therefore normally extend from the tool assembly, to which it remains attached because of the unextruded butt 5, across the press table, the mobile table and onto the fixed table. Since all of the surfaces of these tables are in the same plane and are substantially continuous except for a small gap between the fixed table and the mobile table, the easily deformable extrusion will have been completely supported throughout its production, and now lies so supported, in a single plane and deformation thereof has been prevented. The next necessary operation is to crop the unextruded butt 5 so that the extrusion will be released from the tool assembly and the press prepared for another extruding operation. To this end it is necessary to move the tool assembly 2 from the press and to the shear assembly 6. This is accomplished by means of the hydraulic device 4 which on actuation moves the tool assembly 2 as well as the press table 3 and the mobile units 8 which are, as above described, connected together for such movement. This movement likewise will tend to deliver to the fixed table 7 a portion of the extruded shape which lies, supported by the mobile table and the press table, between the tool assembly and the fixed table. As the tool assembly is moved toward the shear, the mobile units 8 approach the fixed table 7 and each in its turn, as its mountings simultaneously reach the points of inclination X, X' of the trackways 13 and 14, will travel downwardly and under the fixed table 7 (Fig. 6) while the portion of the extrusion supported by the unit slides onto the fixed table surface 9. For the reasons previously described the surface 10 of each mobile unit will leave its normal position in the plane of the fixed table surface while maintaining parallel to that plane. The slots in the lugs 19 are cut to such length as to allow a complete downward movement of the pin 18 therein to the extent that the unit is lowered, thus insuring a positive connection with the following unit which will, nevertheless, not disturb the downward travel of the preceding unit. Thus as each unit 8 is lowered and loses contact with the extruded shape which it has previously supported in the plane of the fixed surface 8, the unit surface 10 remains parallel to said plane and loses said contact without disturbing the level of the shape, and transfer of the shape to the fixed table 7 is accomplished without any vertical displacement of the shape from the original plane of its support. The mobile units are preferably of such number and so proportioned that as the tool assembly 2 comes into position under the shear 6, all of said units may be in lowered position with the end of the press table 3 close to the adjacent end of the fixed table 7 (as shown in Fig. 3) but, in cooperation with presses having a lesser distance of tool travel to shearing position, one or more of said mobile units may still remain in normal position (as indicated in Fig. 6) when shearing position is reached. It is preferred that, consistent with a minimum number of mobile units, the length of each unit be as short as possible so as to prevent the formation of an excessively large gap in the line of support at the lowering point for the units, while accommodating for presses of different capacities and lengths of tool travel.

When the tool assembly has reached the shear, as shown in Fig. 3, the latter is actuated to cut the unextruded butt 5 from the extruded shape. This releases the shape from the tool assembly and such of the shape as remains between the tool assembly and the fixed table 7 is now pulled onto the fixed table. Thereafter the tool assembly 2, the press table 3 and the mobile units 8 are returned to their original or normal position by the hydraulic device 4.

It will be noted that throughout the above-described operation the extruded shape is supported in a single plane, that the mobile table continuously provides support in this plane between the press assembly and the final receiving surface of the fixed table 7, and that the movement of the mobile units, as the gap between the press table 3 and the fixed table 7 is closed, is such as to preclude any vertical or other displacement of the extruded shape from said plane. It will further be apparent that the essential parallelism between the plane of the surfaces 10 of the mobile units and the normal plane of support from which they are successively lowered need not be maintained except during the removal of the surface 10 from said plane. Consequently the relative position of the mobile unit surface after the initial lowering is of no consequence since once the mobile unit has been removed from the field of possible contact with the supported shape, its further disposition has no functional effect.

According to the provisions of the patent statutes, I have explained the principle and operation of my invention and a preferred embodiment thereof. However, it will be understood that, within the scope of the appended claims, the invention may be practiced otherwise than as specifically illustrated and described.

I claim:

1. In a work handling device, a fixed table having a work receiving surface, a mobile table comprised of surface supporting units and normally positioned with the unit surfaces in the plane of the fixed table surface all to form an extension thereof, means for moving the mobile table toward and under the fixed table, tracks each comprising a portion adapted to support the mobile table in its said normal position and a downwardly inclining portion adapted to lower the mobile table at a point in its movement toward the fixed table, and mountings supporting opposite ends of the table units on different tracks, the point of downward inclination of each track being so spaced with linear reference to the inclination point of another track that during movement therealong the surface of a table unit will remain substantially parallel to the plane of the fixed table surface as it is lowered out of that plane and under said fixed table, the adjacent ends of said surface supporting units of said mobile table being so connected for relative movement therebetween that each unit, as it moves out of and into the plane of said fixed table, moves respectively downwardly and upwardly in right angle relationship to adjacent units.

2. In a work handling device, a fixed table having a work receiving surface, a mobile table comprising surface supporting units directly linked together for vertical movement with respect to each other and normally positioned with the unit surfaces in the plane of the fixed table surface to form an extension thereof, means for moving the mobile table toward the fixed table, tracks each comprising a portion adapted to support the mobile table in its said normal position and a downwardly inclining portion adapted to lower the mobile table at a point in its movement toward the fixed table, and mountings supporting the opposite ends of a table unit on different tracks, the point of downward inclination of each track being so spaced with linear reference to the inclination point of another track that during movement therealong the surface of a table unit will remain substantially parallel to the plane of the fixed table surface as it is lowered out of that plane, said linkage between supporting units being adapted to guide each unit downwardly in right angle relationship with respect to adjacent units as the unit moves out of the plane of the fixed table.

3. In a work handling device, a work receiving surface composed of a fixed portion and a mobile portion lying in the plane of the fixed portion when normally positioned to form an extension of the fixed portion, said mobile portion comprising separate surface carrying units linked together for vertical movement with respect to each other, means for moving the normally positioned mobile portion toward and away from the fixed portion in a fixed path, means located at a point in said forward movement to successively lower each unit of the mobile portion as it approaches the fixed portion and to successively raise each of said units as it moves away from said fixed portion and to maintain its surface parallel to the fixed work receiving surface as it is removed from and returns to the plane of said fixed surface, said linkage between supporting units being adapted to guide each unit downwardly in right angle relationship with respect to adjacent units as the unit moves out of the plane of the fixed table.

4. In an extrusion apparatus, in combination, a press, a fixed table for finally receiving extruded shapes from said press, a mobile table normally positioned in operative alignment between the press and the fixed table to preliminarily receive said shapes from said press, means for moving said mobile table toward said fixed table, and means located at a point in said movement to lower said mobile table and to maintain the surface thereof parallel to the plane of its surface in said normal position during its removal from that position.

5. In an extrusion apparatus, in combination, a press, a fixed table for finally receiving extruded shapes from said press, a mobile table normally positioned in operative alignment between the press and the fixed table to preliminarily receive said shapes from said press, the mobile table comprising separate units linked for vertical movement with respect to each other, means for moving said mobile table toward said fixed table, and means located at a point in said movement to successively lower each table unit and to maintain the surface thereof parallel to the plane of its surface in said normal position during its removal from that position.

6. In an extrusion apparatus, in combination, a press, a movable tool assembly in said press, a fixed table for finally receiving extruded shapes from said press, a mobile table normally positioned in operative alignment between the press and the fixed table to preliminarily receive said shapes from said press, the mobile table comprising separate units linked for vertical movement with respect to each other and being adapted to move with said tool assembly in the direction of the fixed table at the end of an extrusion operation, means for imparting said movement, and means located at a point in said movement to successively lower each table unit and to maintain the surface thereof parallel to the plane of the normal position of said surface during its removal from said plane.

7. In an extrusion apparatus, in combination, a press, a fixed table for receiving extruded shapes from said press, a mobile table unit normally positioned in operative alignment between the press and the fixed table to preliminarily receive said shapes from said press, means for moving the mobile unit toward the fixed table, tracks each comprising a portion adapted to support said mobile unit in said normal position and an inclining portion adapted to guide said unit downwardly at a point in its movement toward said fixed table, and mountings supporting opposite ends of said unit for movement on different tracks, the point of downward inclination of each track being so spaced with linear reference to the inclination point of another track that the surface of said unit will remain in a plane parallel to the plane occupied by it in normal position during its lowering out of that position.

EDWARD HUGH BUTLER.